(12) United States Patent
Buer (10) Patent No.: US 6,188,257 B1
(45) Date of Patent: Feb. 13, 2001

(54) POWER-ON-RESET LOGIC WITH SECURE POWER DOWN CAPABILITY

(75) Inventor: Mark Leonard Buer, Gilbert, AZ (US)

(73) Assignee: VLSI Technology, Inc., San Jose, CA (US)

( * ) Notice: Under 35 U.S.C. 154(b), the term of this patent shall be extended for 0 days.

(21) Appl. No.: 09/241,175

(22) Filed: Feb. 1, 1999

(51) Int. Cl.[7] .................................. G06F 1/24; H03L 7/00
(52) U.S. Cl. ............................ 327/143; 327/198; 327/39; 326/94
(58) Field of Search ..................................... 327/142, 143, 327/198, 545, 39, 42, 47; 326/94; 323/901

(56) References Cited

U.S. PATENT DOCUMENTS

| | | | |
|---|---|---|---|
| 3,950,654 | * | 4/1976 | Broedner et al. ...................... 327/143 |
| 5,323,066 | * | 6/1994 | Feddeler et al. ...................... 327/142 |
| 5,778,238 | * | 7/1998 | Hofhine ................................. 327/143 |
| 5,929,672 | * | 7/1999 | Mitani .................................. 327/143 |
| 5,949,261 | * | 9/1999 | Field et al. ............................ 327/156 |

\* cited by examiner

*Primary Examiner*—Timothy P. Callahan
*Assistant Examiner*—Terry L. Englund
(74) *Attorney, Agent, or Firm*—Douglas L. Weller (57) ABSTRACT

Power-on-reset logic is included within an integrated circuit. The power-on-reset logic includes a power-on-reset cell. The power-on-reset cell causes a reset signal to be issued upon a power signal being connected to the integrated circuit. The power-on-reset cell includes a power down input connected to a power-down line. When a power-down signal is placed on the power-down line, the power-on-reset cell is inactivated so that the power-on-reset cell does not cause the reset signal to be issued upon the power signal being connected to the integrated circuit. The power-on-reset logic also includes a logic block connected to the power-down line and to a system clock. The logic block issues a reset when the power-down signal is placed on the power-down line and the system clock is active. For example, the logic block is a delay (D) flip-flop having a D input connected to the power down line and a clock input connected to the system clock.

8 Claims, 5 Drawing Sheets

POWER-ON-RESET LOGIC WITH SECURE POWER DOWN CAPABILITY

RELATED APPLICATION

The subject matter of the present patent application is related to the subject matter set out by the same inventor (Mark Leonard Buer) in a co-pending patent application Ser. No. 09/241,176, filed on the same date as this patent application, for INTEGRATION OF SECURITY MODULES ON AN INTEGRATED CIRCUIT, assigned to the same assignee.

BACKGROUND

The present invention concerns security protection within an integrated circuit design and pertains particularly to power-on-reset logic with secure power down capability.

For some processing applications, it is essential to operate in a secure environment so that operations cannot be probed or altered. In the prior art, various methods have been used to provide for a secure processing environment.

A power-on-reset cell provides a known state for a device when power is applied. Initializing to a known state is critical to a secure processor chip. This is used to ensure the initial state of the processing chip is always defined. Therefore, the integrity of the power-on-reset cell is imperative for the security of the system.

However, there are test strategies that require that all elements of an integrated circuit to be powered down into a low power state to test the chip at time of manufacture (called IDDQ testing). Since during IDDQ testing the state of any register or information on the integrated circuit cannot be defined at power-on time, it is desirable to place the power-on-reset cell into a power-down state in order to allow testing.

However if an external pin is used to power down the power-on-reset cell, the external pin could potentially be used by an attacker to bypass the power-on-reset cell and bring the integrated circuit up into an undefined initial state. It is desirable, therefore, to find a way to allow a power-on-reset cell to be powered down for testing while assuring that the power-on-reset feature of the integrated circuit cannot be bypassed by an attacker.

SUMMARY OF THE INVENTION

In accordance with the preferred embodiment of the present invention, power-on-reset logic is included within an integrated circuit. The power-on-reset logic includes a power-on-reset cell. The power-on-reset cell causes a reset signal to be issued upon a power signal being connected to the integrated circuit. The power-on-reset cell includes a power down input connected to a power-down line. When a power-down signal is placed on the power-down line, the power-on-reset cell is inactivated so that the power-on-reset cell does not cause the reset signal to be issued upon the power signal being connected to the integrated circuit.

In the preferred embodiment, the power-on-reset logic also includes a logic block connected to the power-down line and to a system clock. The logic block issues a reset when the power-down signal is placed on the powerdown line and the system clock is active. For example, the logic block is a delay (D) flip-flop having a D input connected to the power down line and a clock input connected to the system clock.

To provide further protection, the power-on-reset logic also includes a low-frequency monitor. The low frequency monitor causes the reset signal to be issued when a frequency of the system clock is below a predetermined low-frequency threshold.

The present invention effectively prevents attempts to bypass the power-on-reset feature of an integrated circuit. When the power-on-reset cell is powered down, an attacker cannot clock the integrated circuit without causing a reset that initializes the integrated circuit to a known state. The addition of a low frequency monitor prevents the system clock from being stopped. If the power down is applied before the integrated circuit goes into a test mode (low frequency monitor disable) the integrated circuit will go into a reset state preventing the power-on-reset from being bypassed.

DESCRIPTION OF THE PREFERRED EMBODIMENT

Figure 1:
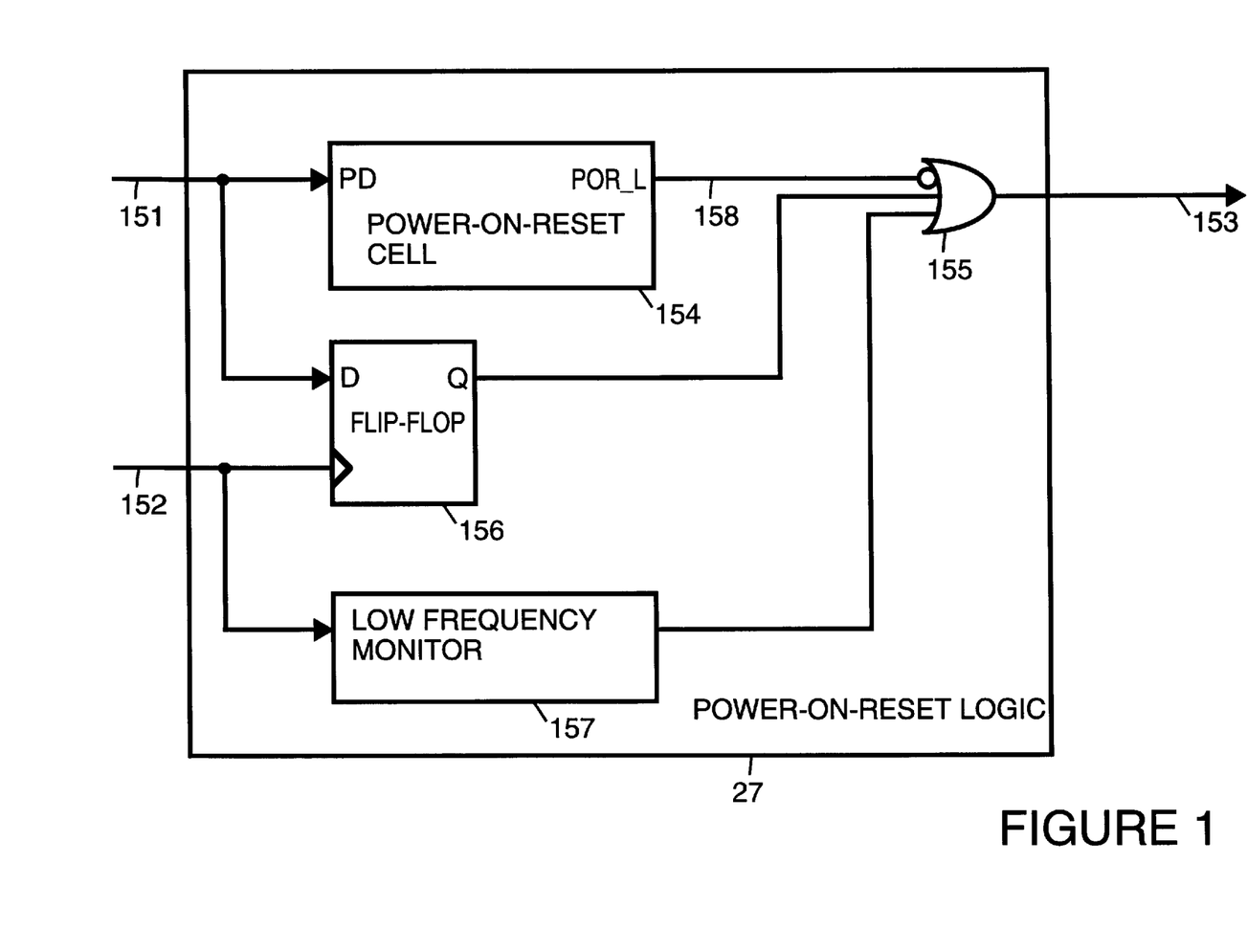
FIG. 1 is a simplified block diagram of power-on-reset logic in accordance with a preferred embodiment of the present invention.

FIG. 1 is a simplified block diagram of power-on-reset logic. A power-on-reset signal on a line 153 is generated by a power-on-reset cell 154, a delay (D) flip-flop 156 or a low frequency monitor 157. The reset signals are collected by a logic OR gate 155. A power down (PD) signal is placed on a line 151. D flip-flop 156 is clocked by the system clock (CLK) placed on a line 152. Low frequency monitor 157 monitors the frequency of the system clock (CLK).

When power is applied to an integrated circuit that utilizes the power-on-reset logic, power-on reset cell 154 is powered down and the integrated circuit remains in a constant state (no reset is issued).

If an attacker were to attempt to bypass power-on-reset cell 154 by asserting the power down signal on line 151, D flip-flop 156 assures that the system clock (CLK) cannot not be used without causing a reset of the integrated circuit. The reset causes the integrated circuit to be initialized to a known state. Low frequency monitor 157 prevents the system clock CLK from being stopped. That is, if the power down signal, generated by a power down pin connected to line 151, is asserted before the integrated circuit goes into a test mode (where low frequency monitor 157 is disabled), then the integrated circuit will go into a reset state if the system clock (CLK) is stopped. The result is that the power-on-reset logic cannot be bypassed effectively.

Figure 2:
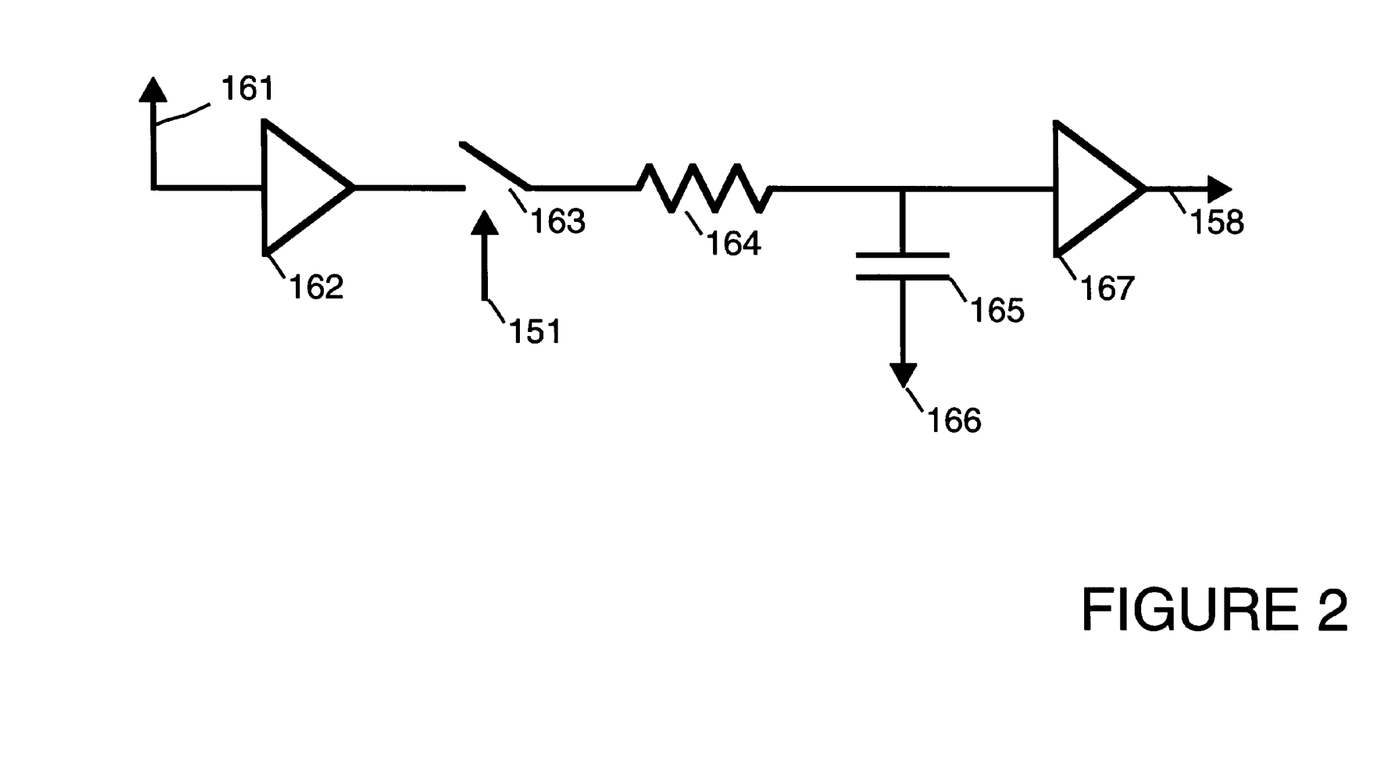
FIG. 2 is a simplified block diagram of a mode of a power-on-reset cell.

FIG. 2 is a simplified block diagram that models an implementation of power-on-reset cell 154. Power-on-reset cell 154 is implemented as a custom cell for a particular process technology. Power-on-reset cell 154 is constructed in such a way to reject noise on the power supply line.

A reset (POR_L) output 158 of power-on-reset cell 154 must stay low for a minimum of 20 microseconds after power has stabilized, The stabilized value of the power rail must be a voltage level that is greater than the implemented process technology minimum operating voltage.

Power down (PD) input 151 to power-on-reset cell 154 must not change the state of reset output 158. If power down input 151 is held high while power is applied, reset output 158 never releases the reset. If power down input 151 is asserted high after the power has been applied and the reset pulse has completed (greater than 20 microseconds after power is applied) then reset output 158 must remain high and not issue a reset.

FIG. 2 shows power-on-reset cell 154 modeled as an RC network consisting of a resistor 164 and a capacitor 165 connected to ground through line 166. VDD is placed on an input line 161. A buffer 162 forwards VDD to a switch 163 controlled by power down input 151. When power down input 151 is inactive (low) then capacitor 165 is allowed to charge. When the power down input 151 is asserted (high) capacitor 165 is not allowed to charge. Capacitor 165 is used to drive reset output 158 through a Schmitt trigger 167. Thus once capacitor 165 reaches the threshold (a time constant equal to 20 microseconds), the reset output 158 is released. While in FIG. 2, power-on-reset cell 154 is modeled as an RC network, actual implementation of the power-on-reset cell is dependent upon the technology utilized.

Figure 3:
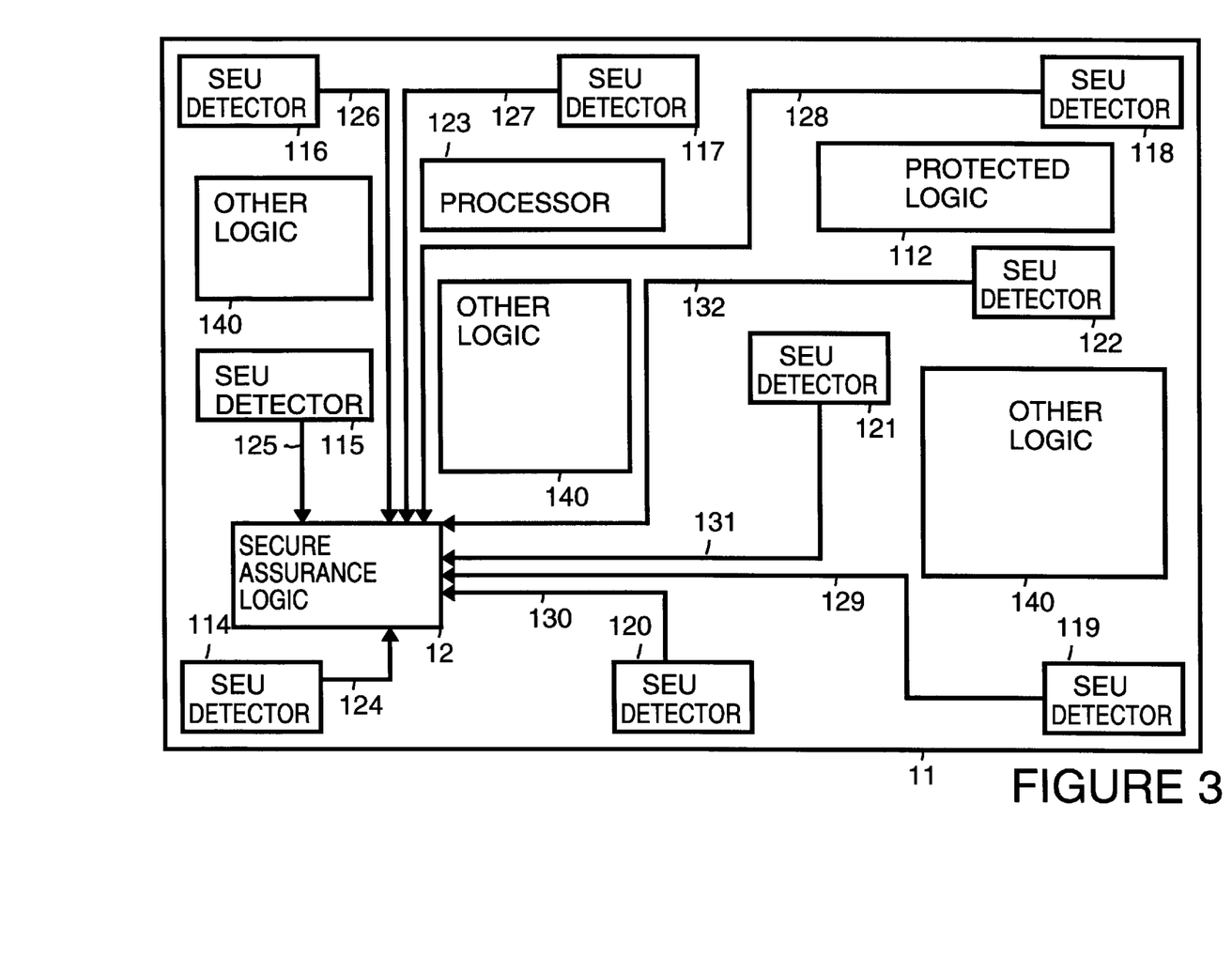
FIG. 3 is a simplified block diagram that shows an integrated circuit within which secure assurance logic is used to guard protected logic in accordance with a preferred embodiment of the present invention.

The power-on-reset logic can be used as part of an overall protection scheme for an integrated circuit. For example, FIG. 3 is a simplified block diagram of an integrated circuit 11 that includes a processor 123, protected logic 112 and other logic 140. Secure assurance logic 12 links together electrical protection within integrated circuit 11. The integration of all secure assurance logic 12 components into a single modular protected block allows processor 123 to control and observe the protection modules for testing without affecting the security of integrated circuit 11. By coupling multiple protection modules together, the security of the system is improved since the protection modules now work together. Additionally reset states for the protection modules can be controlled such that power down for IDDq testing does not defeat the security of the integrated circuit.

Figure 4:
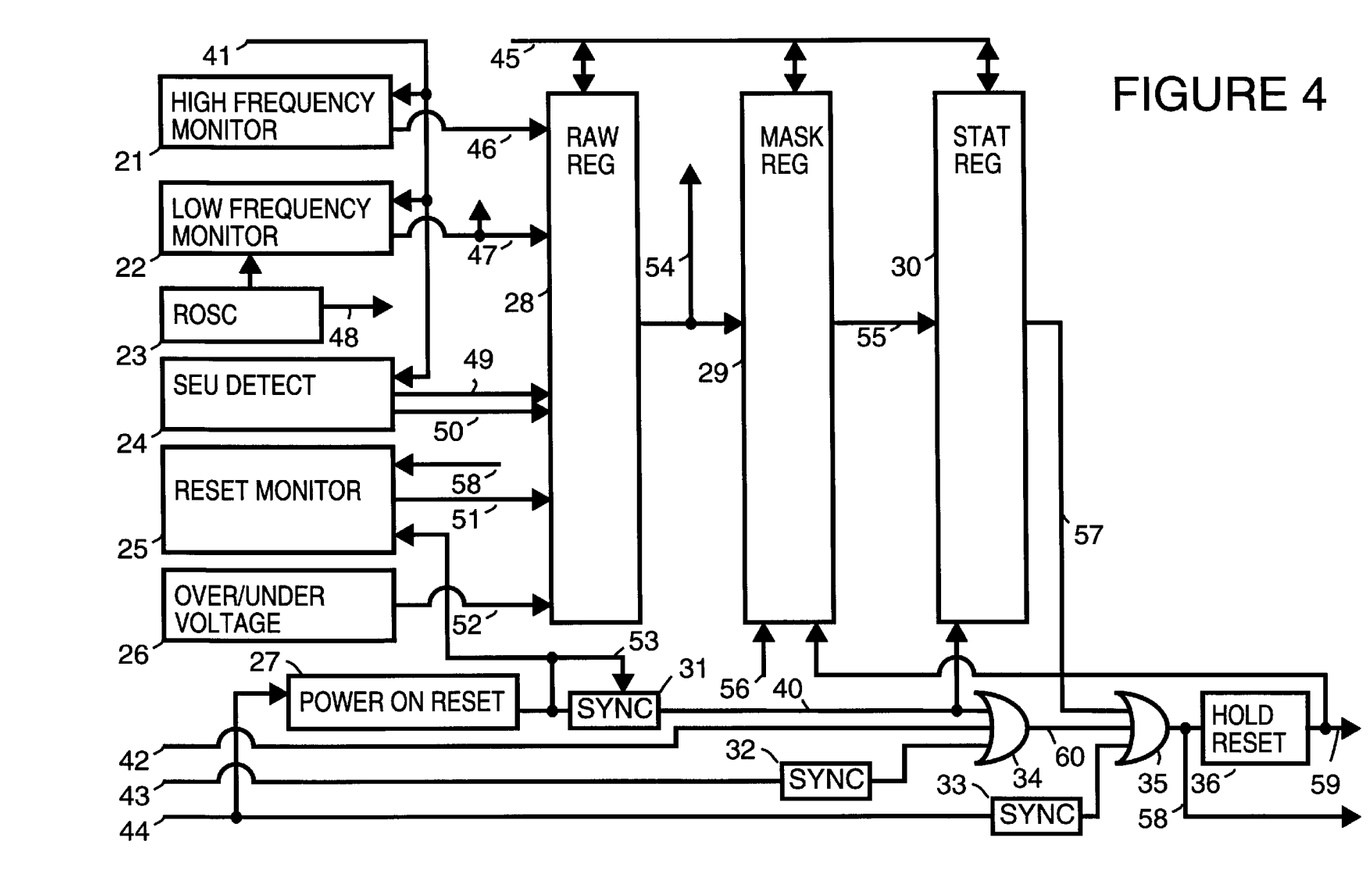
FIG. 4 is a simplified block diagram that shows secure assurance logic that links together electrical protection within an integrated circuit in accordance with a preferred embodiment of the present invention.

FIG. 4 is a simplified block diagram of secure assurance logic 12. A monitored clock signal (MON_CLK) is placed on a monitor clock signal line 41. Components within secure assurance logic 12 monitor and protect the monitored clock. A mask register 29 is used to allow masking of particular security assurance features so that individual security features (i.e., alarm signals) can be turned off for certain operations via processor 123. This also allows each of the features to be tested. Since there are duplicated security features in integrated circuit 11, the assurance logic can be tested at startup without causing a problem and without allowing an opening for an attacker.

Secure assurance logic 12 includes a high frequency monitor 21, a low frequency monitor 22 (equivalent to low frequency monitor 157 shown in FIG. 1), a single event upset (SEU) detect monitor 24, a reset monitor 25, and an over/under voltage monitor 26.

Alarms from the monitoring modules are integrated using a raw register 28, mask register 29 and a status register 30. Processor 123, using a bus 45 can read and write information to raw register 28, mask register 29 and status register 30.

Raw alarm sources are trapped asynchronously in raw register 28. The alarms are output on alarm lines 54. The alarms are masked by values in mask register 29 prior to being forwarded to status register 30. The masked alarms are forwarded to status register 30 on lines 55. The asynchronous trap is required since a valid clock source cannot be guaranteed at the time of the alarm. The asynchronous trap is double synchronized to the clock domain of processor 123 and then sampled by status register 30. Once a bit in the status register is set, the corresponding asynchronous trap is cleared. An alarm set in status register 30 results in a reset signal being placed on a line 57.

As shown in FIG. 4, power-on-reset cell 27 (equivalent to power-on-reset cell 154 shown in FIG. 1), a software reset placed on a line 42 and a reset (PINRST_L) line 43 all are used to reset the monitoring system. The reset signals are synchronized by a synchronization block 31, a synchronization block 32 and a synchronization block 33 (equivalent to flip-flop 156 shown in FIG. 1), connected as shown. A logic OR gate 34 and a logic OR gate 35 combine the reset signals to form the reset (RSROUT_L) on line 58. A hold reset block 36 holds the resets for a predetermined number of clock cycles and generates a reset delete (RSTDEL_L) signal on a reset delete line 59.

Figure 5:
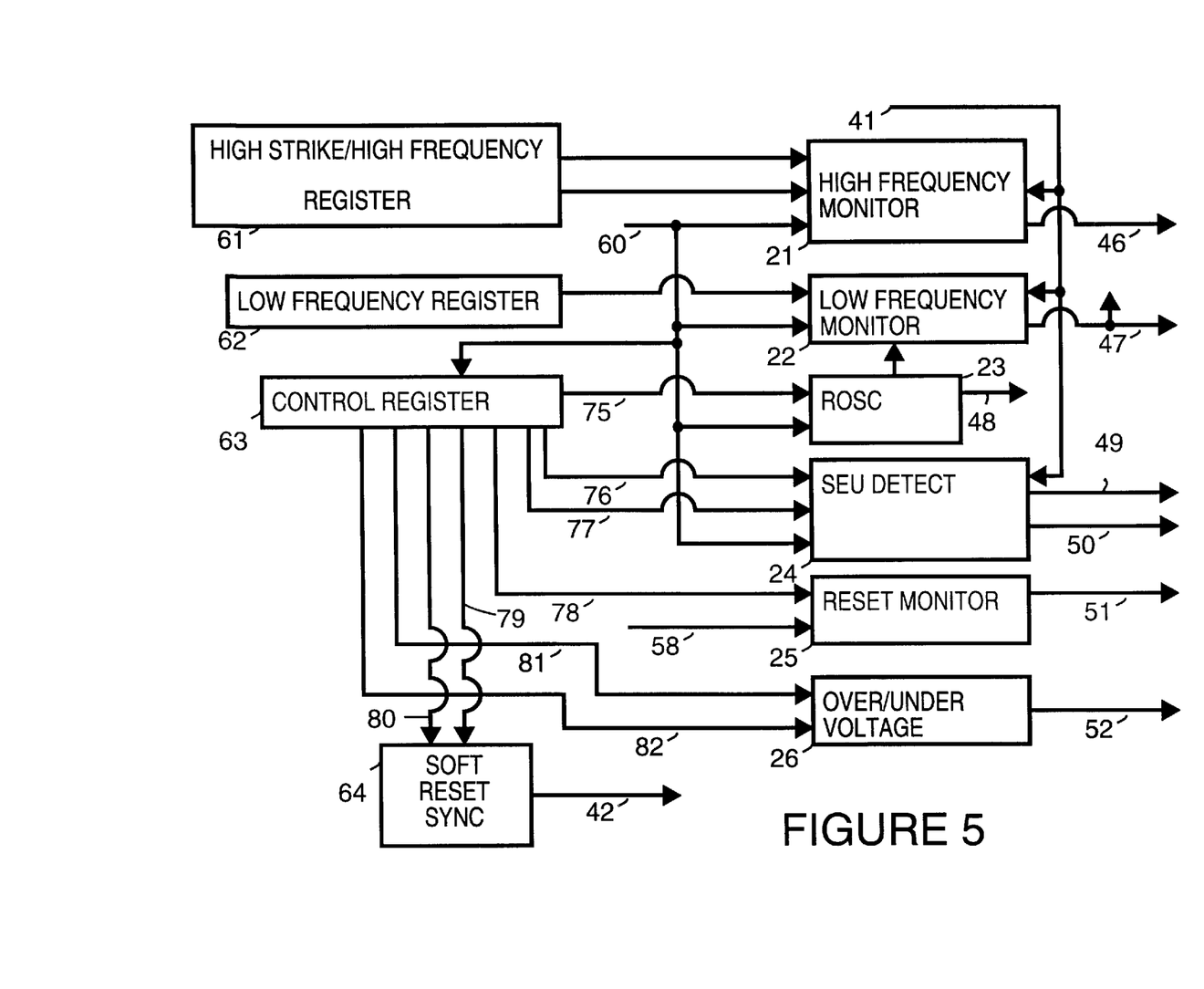
FIG. 5 is a simplified block diagram that shows additional secure assurance logic that links together electrical protection within an integrated circuit in accordance with a preferred embodiment of the present invention.

A soft reset synchronizer 64 (shown in FIG. 5) generates the software reset placed on line 42. Control register 63 (shown in FIG. 5) stores two control bits for soft reset synchronizer 64 that are forwarded to soft reset synchronizer 64 on a line 79 and a line 80. An output 60 of logic OR gate 34 (shown in FIG. 4) is used as a reset input to high frequency monitor 21, low frequency monitor 22, control register 63, ring oscillator 23 and single event upset (SEU) detect monitor 24, as shown in FIG. 5.

Low frequency monitor 22 uses a reference clock that is generated by an internal ring oscillator (ROSC) 23 to make comparisons to the monitored clock signal (MON_CLK) on monitor clock signal line 41. Ring oscillator 23 must be used since low frequency monitor 22 needs to be able to detect when the monitored clock signal has stopped. Low frequency monitor 22 places a low frequency alarm (switch clock (SWITCLK) on a line 47.

Since the monitored clock is sampled, low frequency monitor 22 may produce a false error at any input clock frequency that violates the Nyquist rate. The monitored clock must be less than eight times the frequency of the reference clock generated by the ring oscillator. An eight-bit low frequency value stored in a register 62 (shown in FIG. 5) is used to configure low frequency monitor 22.

High frequency monitor 21 is used to ensure the monitored clock signal (MON_CLK) on monitor clock signal line 41 is below the maximum frequency of the device. Since high frequency monitor 21 uses the critical path of the device to determine if the clock frequency is too fast, the result is an operating point detection that includes monitoring the voltage, process, and temperature.

The high frequency limit is not fixed, but is determined by the capability of the device. In a system where there is a best case processed device at zero degrees with nominal voltage, the frequency of the device is allowed to be higher than when operation occurs at high temperature and lower voltage. Since the operating point is programmable, high frequency monitor 21 can be used to adjust a phased locked loop (PLL) frequency for the current operating environment. High frequency monitor 21 places a high frequency alarm on a line 46.

An eight-bit high strike value and an eight-bit high frequency value stored in a register 61 (shown in FIG. 5) are used to configure high frequency monitor 21.

Reset monitor 25 counts the number of resets (reset out signal (RSROUT_L) on reset out line 58) that are issued.

Once the reset limit has been reached, reset monitor 25 issues an alarm on a line 51. Reset monitor 25 can be cleared using a clear strike bit in a control register 63 (shown in FIG. 5). Software is used to clear reset monitor 25 after completing the boot processing for the integrated circuit and waiting a random period of time.

The alarm 51 from reset monitor 25 is used to issue a device reset (if unmasked in mask register 29). After reset, further manual resets (PINRST_L) issued on a line 43 are ignored until this alarm has been cleared in status register 30. Control register 63 (shown in FIG. 5) stores a clear bit for reset monitor 25 that is forwarded to reset monitor 25 on a line 78.

Over and under voltage detectors 26 are used to protect against a voltage level that is not valid for the process technology. The minimum operating core voltage and the maximum operating core voltage for the process are used as boundaries for the voltage detection.

The voltage ranges specified for the activation ranges of the detectors are based on the process technology in which the integrated circuit is implemented. Below the under voltage activation range, an under voltage error will always be detected. Above the power-on-reset (POR) activation range, power-on-reset 27 will always be inactive (not asserted). Above the over voltage detection (OVI)) activation range, the over-voltage detector will generate an alarm. Below the over-voltage detector activation range, the over-voltage detector will not generate an alarm.

In many process technologies the under voltage activation range and the POR activation range overlap. In this case, the under voltage detector is not implemented (i.e., it is tied off in design). Whenever, the under voltage detector is not implemented, the POR activation range should be set based on the VDD −10% requirement instead of VDD minimum to ensure that the under voltage violations will cause a POR reset.

In the preferred embodiment the under voltage detection portion of over and under voltage detectors 26 monitors the core VDD voltage supply to ensure that the voltage level never drops below the minimum required core voltage for the given process. An error must not be detected when VDD is within the valid operating range of the device that is core VDD +/−10%.

In the preferred embodiment the under voltage detection portion of over and under voltage detectors 26 has a power down (PD) input 81 that can be used for IDDq testing. The output state of the device should not indicate an error when powered down regardless of the core VDD value. The under voltage design also rejects noise on the power supply line. The under voltage detection portion of over and under voltage detectors 26 is capable of being routed with the digital logic and does not cause errors due to digital switching noise.

The over voltage detection portion of over and under voltage detectors 26 monitors the core VDD supply to ensure that the voltage level never rises above the maximum allowed core voltage for the given process. Additionally, an error must not be detected when VDD is within the valid operating range of the device which is core VDD +/−10%.

The over voltage detection portion of over and under voltage detectors 26 also has a power down (PD) input 82 that can be used for IDDq testing. The output state does not indicate an error when powered down regardless of the core VDD value. The over voltage detection portion of over and under voltage detectors 26 is constructed in such a way to reject noise on the power supply line.

Single event upset (SEU) detect monitor 24 tracks the logic operation and detects single or multiple bit errors within 256 clock periods. In the preferred embodiment the detection logic is fully digital logic implemented within integrated circuit 11. When a single event upset is detected, single event upset detect monitor 24 places an alarm on alarm line 49 or alarm line 50. Control register 63 stores two error bits (r_err and p_err) for single event upset detect monitor 24 that are forwarded to single event upset detect monitor 24 on a line 76 and a line 77.

FIG. 3 shows use of single event upset detectors scattered throughout integrated circuit 11. Some of the single event upset detectors are placed near protected logic 112 (e.g., cryptographic logic) that is being protected. Additional single event upset detectors are placed as far away from the protected logic as possible to be used for comparison. The number of single event upset detectors used is determined by the overall gate count of the integrated circuit 11. A good rule of thumb is about one counter for every 15 k–20 k gates of cell based logic (do not include RAM or ROM in this calculation) in the design per logic block within integrated circuit 11.

The single event upset detectors are represented in FIG. 3 by a single event upset detector 114, a single event upset detector 115, a single event upset detector 116, a single event upset detector 117, a single event upset detector 118, a single event upset detector 119, a single event upset detector 120, a single event upset detector 121 and single event upset detector 122. FIG. 3 is not drawn to scale. The single event upset detectors are scattered throughout secure integrated circuit 11 in order to detect event that occur even in seemingly non-critical areas of secure integrated circuit 11.

Single event upset detect monitor 24 (shown in FIG. 4) within secure assurance logic 12 collects single event upset detection information from single event upset detector 114 via a data path 124. Single event upset detect monitor 24 within secure assurance logic 12 collects single event upset detection information from single event upset detector 115 via a data path 125. Single event upset detect monitor 24 within secure assurance logic 12 collects single event upset detection information from single event upset detector 116 via a data path 126. Single event upset detect monitor 24 within secure assurance logic 12 collects single event upset detection information from single event upset detector 117 via a data path 127. Single event upset detect monitor 24 within secure assurance logic 12 collects single event upset detection information from single event upset detector 118 via a data path 128. Single event upset detect monitor 24 within secure assurance logic 12 collects single event upset detection information from single event upset detector 119 via a data path 129. Single event upset detect monitor 24 within secure assurance logic 12 collects single event upset detection information from single event upset detector 120 via a data path 130. Single event upset detect monitor 24 within secure assurance logic 12 collects single event upset detection information from single event upset detector 121 via a data path 131. Single event upset detect monitor 24 within secure assurance logic 12 collects single event upset detection information from single event upset detector 122 via a data path 132.

Each of single event upset detectors 114 through 122 uses digital logic to detect single event upsets. For example bit registers, each composed of a flip-flop, within single event upset detectors are monitored for a state transition due to single event upset. The flip-flops are utilized in a predetermined pattern and then are monitored for errors that occur during operation. An error in the state transition can indicate, for example, a single event upset caused by radiation, alpha particles or some other operation error.

Power-on-reset cell 27 provides a known state for the device when power is applied. Initializing to a known state is critical to a secure integrated circuit. Power-on-reset cell 27 uses the application of power to generate a reset output that is not released until the power has stabilized.

The integrity of power-on-reset cell 27 is imperative for the security of integrated circuit 11. Current test strategies require that all elements of a chip should be powered down into a low power state for IDDq testing. Since the initial state of any element on the device is only trusted when power-on-reset cell 27 is active, there is an external pin connected to a power down line 44 used to power down power-on-reset cell 27. The external pin cannot be trusted by secure assurance logic 12 such that it would bypass the power-on-reset cell 27 and result in an unknown state after power up.

Ring oscillator (ROSC) 23 provides the reference clock for low frequency monitor 22. In addition ring oscillator 23 provides an oscillator clock (OSC CLK) on an output line 48. The oscillator clock is used for active zeroization. Ring oscillator 23 is fully tested via scan test modes by breaking the ring oscillator chain and inserting flip-flops that make the chain observable and controllable.

The frequency value of the ring oscillator 23 can be tuned after layout using (OSC_CFG) input pins to tune which tap point is used for the end of the ring oscillator 23. These configuration inputs must be fixed for the final layout of the device. Control register 63 (shown in FIG. 5) stores a disable bit for ring oscillator 23 that is forwarded to ring oscillator 23 on a line 75.

Pin reset line (PINRST_L) 43 is the external reset from the input pad of the integrated circuit. Since the pin reset (PINRST_L) is controlled outside the integrated circuit, it cannot be trusted. The pin reset is assumed to be asynchronous by the integrated circuit. The external reset must be asserted for at least one clock cycle to ensure that synchronization logic 32 captures the reset. Synchronization logic 32 provides double synchronization for meta-stability. The pin reset (external reset) will not be propagated to the core as a reset for two clock periods when asserted.

Secure assurance logic 12 can be used to implement active zeroization in a security device. Secure assurance logic 12 supplies a guaranteed valid clock at all times by coupling the high and low frequency monitor. Whenever a high or low frequency error is detected, enabled and trapped, the switch clock (SWTICLK) signal is active on line 47. The SWTICLK signal can be used to multiplex the OSC_CLK signal on output line 48 with the system clock (prior to the clock tree). Since a device reset is issued based on the trapped violation, there is no requirement that this switch over be glitch free. Since the current clock may indeed be stopped, in the preferred embodiment this connection is made directly with a multiplexer. Once the switch over has occurred to the oscillator clock signal on output line 48, processor 123 (or other hardware logic) can make decisions about active zeroization based on the status register bits within status register 30 or the alarm output.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. Power-on-reset logic within an integrated circuit comprising:
    a power-on-reset cell, including:
        a power down input connected to a power-down line, wherein when a power-down signal is not placed on the power-down line, the power-on-reset cell is activated so that the power-on-reset cell issues a first reset signal upon a power signal being connected to the integrated circuit, and wherein when the power-down signal is placed on the power-down line, the power-on-reset cell is inactivated so that the power-on-reset cell does not issue the first reset signal upon the power signal being connected to the integrated circuit;
    a logic block connected to the power-down line and to a system clock, the logic block issuing a second reset signal when the power-down signal is placed on the power-down line and the system clock is active; and,
    combining means for generating a power-on-reset signal when the power-on-reset cell issues the first reset signal or the logic block issues the second reset signal.

2. Power-on-reset logic as in claim 1 wherein the logic block is a delay (D) flip-flop having a D input connected to the power down line and a clock input connected to the system clock.

3. Power-on-reset logic as in claim 1 additionally comprising:
    a low-frequency monitor coupled to the system clock, the low frequency monitor issuing a third reset signal when a frequency of the system clock is below a predetermined low-frequency threshold; wherein the combining means also generates the power-on-reset signal when the low frequency monitor issues the third reset signal.

4. Power-on-reset logic as in claim 3 wherein the combining means comprises a logic OR gate that combines outputs from the power-on-reset cell, the logic block and the low-frequency monitor.

5. Power-on-reset logic within an integrated circuit comprising:
    a power-on-reset cell, the power-on-reset cell issuing a first reset signal upon a power signal being connected to the integrated circuit;
    a low-frequency monitor coupled to a system clock, the low frequency monitor issuing a second reset signal when a frequency of the system clock is below a predetermined low-frequency threshold; and,
    combining means for generating a power-on-reset signal when the power-on-reset cell issues the first reset signal or the low-frequency monitor issues the second reset signal.

6. A method for providing a power-on-reset feature to an integrated circuit comprising the following steps:

(a) issuing, by power-on-reset logic, a reset signal upon a power signal being connected to the integrated circuit when a power-down signal is not asserted; and, (b) issuing, by the power-on-reset logic, the reset signal when the power-down signal is asserted and a system clock is active.

7. A method as in claim 6 additionally comprising the following steps:

(c) monitoring a frequency of the system clock; and, (d) issuing the reset signal when the frequency of the system clock is below a predetermined low-frequency threshold.

8. A method for providing a power-on-reset feature to an integrated circuit comprising the following steps:

(a) issuing, by a power-on-reset logic, a reset signal upon a power signal being connected to the integrated circuit when a power-down signal is not asserted;

(b) monitoring a frequency of a system clock; and, (c) issuing the reset signal when the frequency of the system clock is below a predetermined low-frequency threshold.

* * * * *